United States Patent

Porter

[15] 3,653,005

[45] Mar. 28, 1972

[54] MECHANICAL STORAGE MEANS FOR REPERTORY DIALER

[72] Inventor: Warren Wesley Porter, Galion, Ohio

[73] Assignee: North Electric Company, Galion, Ohio

[22] Filed: Aug. 25, 1969

[21] Appl. No.: 852,662

[52] U.S. Cl. ....................340/173 SP, 340/166

[51] Int. Cl. ....................G11c 17/00

[58] Field of Search ....................340/173 SP

[56] References Cited

UNITED STATES PATENTS

| | | | |
|---|---|---|---|
| 2,872,664 | 2/1959 | Minot | 340/173 |
| 2,964,740 | 12/1960 | Hense | 340/173 |
| 3,245,051 | 4/1966 | Robb | 340/173 |
| 3,011,156 | 11/1961 | MacPherson | 340/173 |

*Primary Examiner*—Terrell W. Fears
*Attorney*—Johnson, Dienner, Emrich, Verbeck & Wagner

[57] ABSTRACT

Mechanical storage apparatus for a repertory dialer including a pair of conductor bearing boards with contacts selectively interconnecting the conductors on one board with the conductors on the other providing a preestablished set of paths for routing successive pulses representing the digits and digital values of a stored directory number to succeeding circuitry which generates corresponding digital signals for use in setting up a communication path.

3 Claims, 5 Drawing Figures

INVENTOR
WARREN W. PORTER

BY Brown Jackson Boettcher & Dienner
ATTORNEYS

P-419-468-8549

INVENTOR
WARREN W. PORTER

BY Brown Jackson Boettcher & Dienner
ATTORNEYS

P-419-468-8549

INVENTOR
WARREN W. PORTER

BY Brown Jackson Boettcher & Dienner
ATTORNEYS

INVENTOR
WARREN W. PORTER

BY Brown, Jackson, Boettcher & Dienner
ATTORNEYS

MECHANICAL STORAGE MEANS FOR REPERTORY DIALER

BACKGROUND OF THE INVENTION

1. Field of the Invention

The invention relates to telephone repertory dialing systems and more particularly to apparatus for storing directory numbers in such systems.

2. Description of the Prior Art

Repertory dialing equipments previously proposed use either magnetic or mechanical storage apparatus for storing digits of the directory numbers to be dialed. Magnetic storage is generally used when a very large repertory is required; however, magnetic storage systems are generally expensive. Mechanical storage apparatus for prior art repertory dialers uses a selector or rotary switch for digit generation. Furthermore, telephone numbers to be dialed are generally hard-wired in the mechanical storage, making it difficult to change the coding of a stored number. These characteristics of prior art automatic dialers result in large equipment and in a reduction in the flexibility of the equipment.

SUMMARY OF THE INVENTION

The present invention provides an inexpensive and yet flexible storage apparatus for repertory dialing system. The storage apparatus includes a pair of conductor bearing sheets of insulating material stacked together with the conductor bearing surfaces opposing one another and a third sheet of insulating material sandwiched between the conductor bearing sheets to insulate the conductors from each other one the one hand but carrying contact members to selectively interconnect conductors of one sheet with conductors of the other sheet. Pulses representative of digits are applied to the conductors on one sheet and are routed to selected conductors on the other sheet over the contact members. The routing of the pulses codes the pulses to be representative of the digits of a directory number selected to be dialed.

In accordance with a preferred embodiment, the conductors are printed on the insulating sheets and accordingly, this provides a flat, compact storage unit which is simple and inexpensive to manufacture.

The use of contact members in a third sheet or coding board for programming a storage unit to store a particular directory number simplifies such coding, and moreover, each storage unit can be recoded to store a different directory number by removing contact members as required from the coding board and repositioning the contact members to provide different interconnections between the conductors of the two sheets.

Furthermore, in one packaging arrangement disclosed for the storage unit, conductors are printed on both sides of the conductor bearing sheets and each sheet provides a number of groups of conductors so that, when assembled, each sheet provides a set of conductors for a number of contact bearing coding boards. Thus, this storage unit provides a compact package which stores a plurality of directory numbers.

Thus, the system is less expensive than magnetic systems, and yet is more compact and more flexible than mechanical dialing devices of the prior art.

DESCRIPTION OF PREFERRED EMBODIMENTS

In the copending U.S. application Ser. No. 852,661 of Blake, de Hilster and Porter which is assigned to the same assignee as the present invention and was filed of even date with this application, there is described a repertory dialer using the mechanical storage techniques of the present invention.

In this repertory dialer there is provided a pulse generating circuit responsive to the depression of a push button for generating pulses which are representative of the various digits of a directory number assigned to that pushbutton to be dialed and a signal generating circuit for generating a plurality of signals representing the different digits, such as digits 1–0, as may comprise the digits of a directory number selected to be dialed by the repertory dialer. The mechanical storage apparatus of the present invention provides a simple and yet efficient way to route successive pulses from the pulse generating circuit to the signal generating circuit, assigning a digit value to each pulse which corresponds to the value of the digit of the stored directory number, to cause the signal generating circuit to be selectively enabled to generate signals to represent the value of each digit of the number selected.

Figure 1:
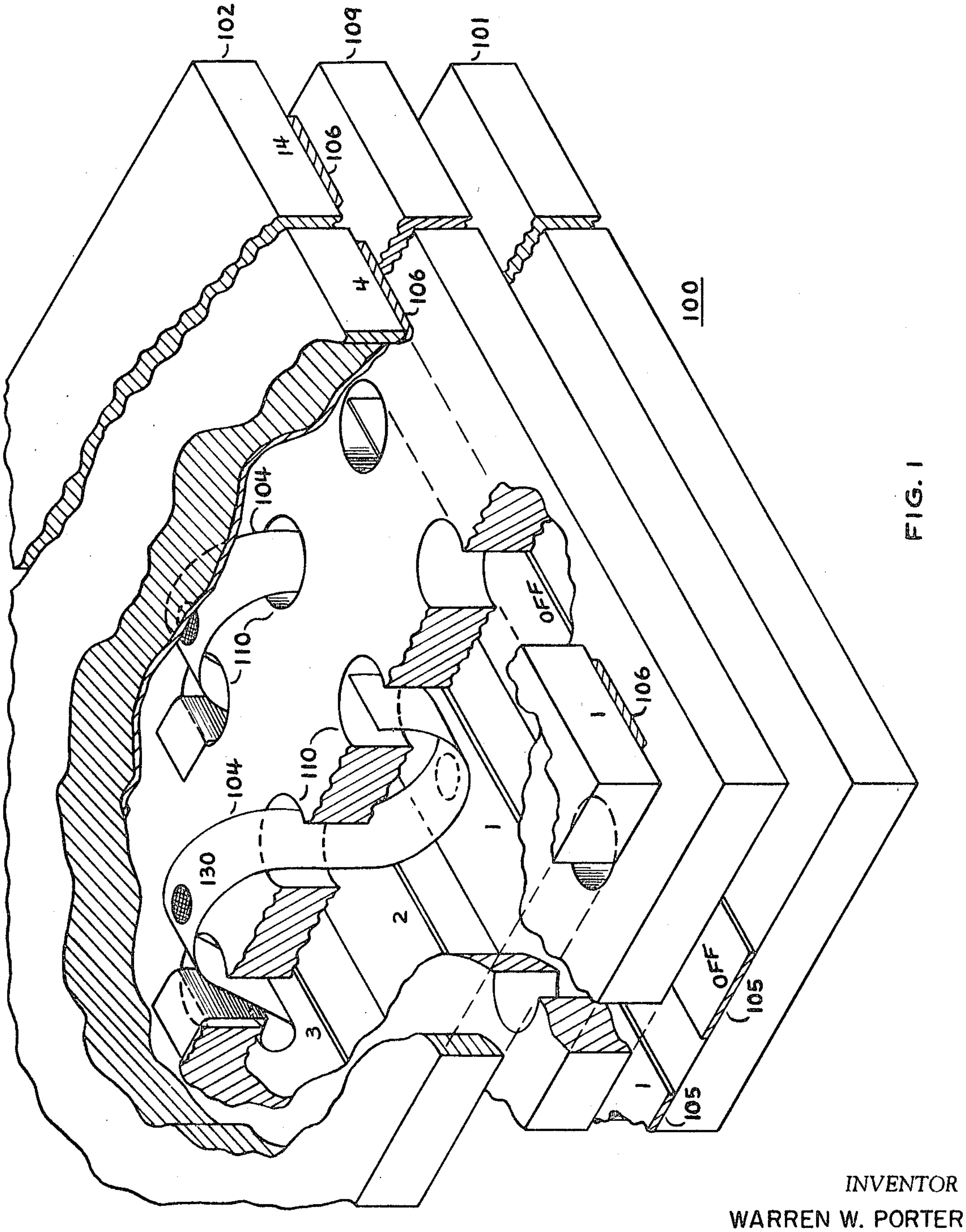
FIG. 1 is a partially sectioned isometric view of a portion of a mechanical storage apparatus of the invention.

Referring briefly to FIG. 1 which is a partially sectioned isometric view of a portion of a directory number digit storage apparatus, according to the invention, a storage module 100 includes a programmable board 109 for establishing a code symbolic of a particular directory number to be generated upon depressing a pushbutton (not shown) associated with the module. The storage module 100 also includes a pair of conductor bearing sheets 101, 102 of an insulating material. These sheets 101, 102 may be, for example circuit boards having conductors 105, 106 printed on a surface thereof. One of the boards, such as board 101, has a plurality of parallel conductors 105, which run the length of the board and the other board 102 has a plurality of parallel conductors 106 disposed on a surface of the board 102 and which extend in a direction perpendicular to the conductors 105 on the board 101. In the embodiment described, board 101 has 13 conductors and board 102 has 14 conductors. The two boards 101 and 102 are assembled so that their printed conductor bearing surfaces face the program board 109. Each of the contact springs 104 selectively connects a conductor of board 101 to a conductor on board 102. The 14 conductors on board 102 represent the position of the 14 possible digits and the 13 conductors on board 101 represent the value of a digit. Selected ones of the conductors 105, 106 on the two boards 101, 102 are interconnected by contact springs 104 set in apertures 110 of the programmable board 109 as will be described in detail hereinafter.

Figure 2B:
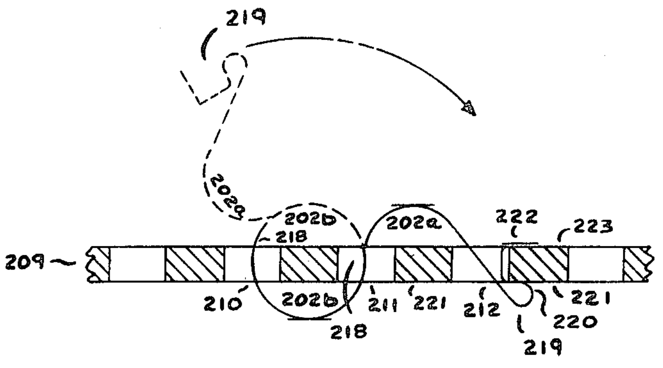
FIG. 2B shows a contact spring used to code the board of FIG. 2A.
Figure 2A:
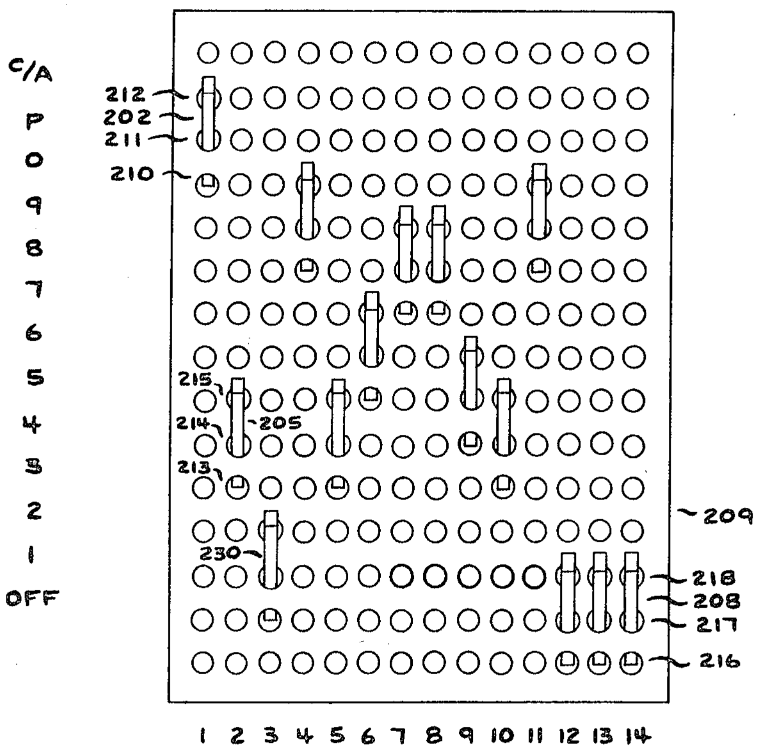
FIG. 2A is a plan view of a board for programming storage apparatus of FIG. 1 to store a directory number.

Referring to FIG. 2A, there is shown a view of a program board 209 of insulating material having contact springs or connectors such as 202, 205, 208, and 230 for providing interconnections between designated conductors of the two sets of conductors on a pair of conductor bearing boards such as boards 101 and 102 of FIG. 1. The program board 209 has 14 rows of equally spaced holes, each row having a column of 15 equally spaced holes.

To program a telephone directory number on the board, contact springs, such as springs 202, 205 and 230, are placed in selected sets of holes, such as holes 210-212, of the program board 209. Each contact spring, such as spring 202, shown in FIG. 2B, comprises an S-shaped member of a resilient metal with each bowed portion 202*a* and 202*b* serving as contacts to engage a conductor disposed on an underlying or overlying conductor bearing board when placed in the program card and assembled as a storage module (FIG. 1).

The contact spring 202 is inserted in the program board 209 in the following manner. First the spring is positioned adjacent apertures 210 and 212, as shown in phantom lines in FIG. 2B, with its end 218 in aperture 211. The spring is rotated clockwise until end 218 enters aperture 210. Then, the other end 219, which is adjacent aperture 212 is pushed into aperture 212 until retaining portion 220 engages the lower surface 221 of the board 209. Retaining portion 222 of spring 202 engages the upper surface 223 of board 209 whereby the spring 202 is secured to the board and held in position.

Accordingly, when the code board 209 is assembled with conductor bearing sheets as shown, for example, by code board 109 of FIG. 1, a portion of the spring including a contact portion 202*a* sandwiched between a conductor board and the program board will tend to push end 219 away from board 209; however, retainer portion 222 will prevent repositioning of the spring to an extent where the spring is released from the hole 212. Likewise, the retaining action of shoulder 220 will prevent release of the spring due to compressing action of another contact portion 202*b*.

Each contact spring threads a set of three holes, such as 210–212 of board 209, as shown in FIG. 2B, with the two contact portions 202*a* and 202*b* of the spring extending out from opposite sides of the board.

The stored number can be altered by recoding the board 209 to a different number. When a spring contact is to be removed from a certain set of holes, a slight pressure is applied near one end 219 of the spring 202, flexing the spring toward the center of hole 212. The spring will release when the end 219 of the spring comes out of hole 212. Contact portion 202b can then be threaded in reverse through hole 211 and the spring 202 removed from the set of holes 210–212 of the program board 209.

Figure 3:
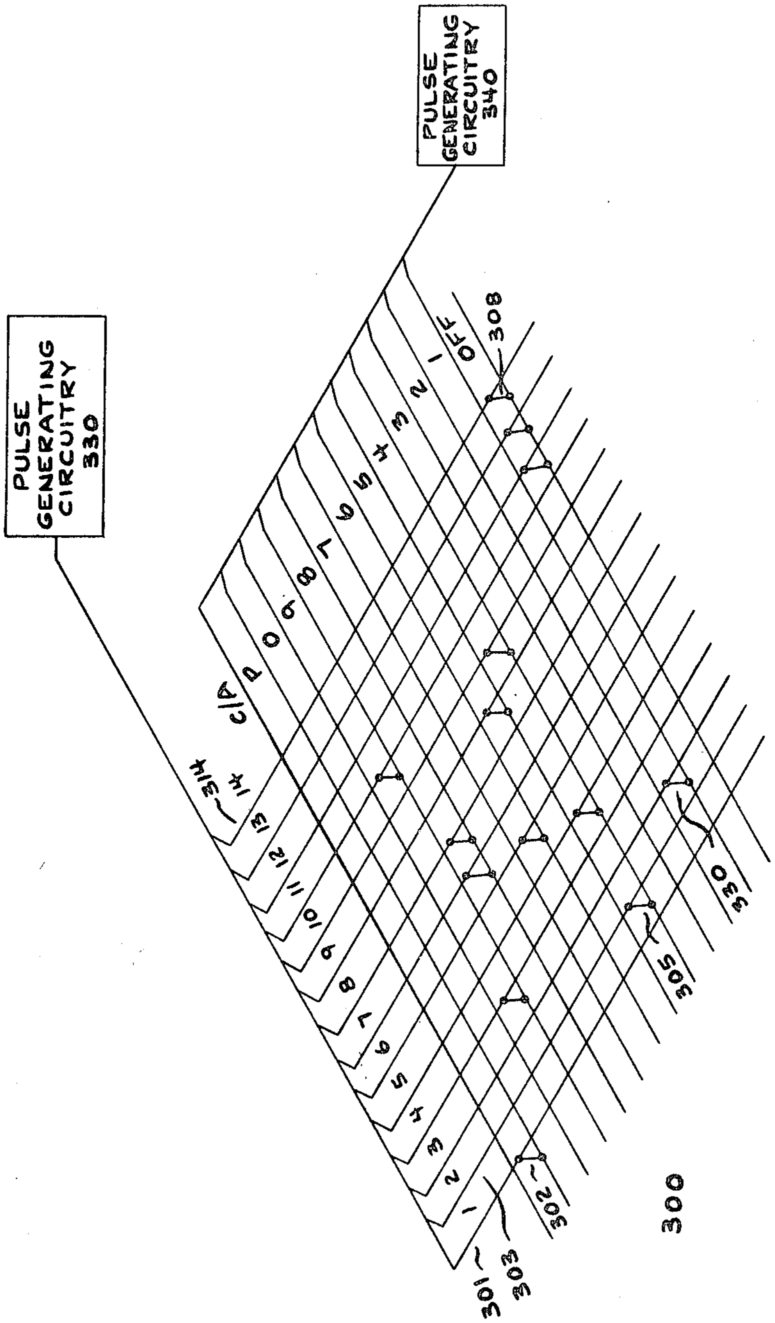
FIG. 3 is a schematic representation of the storage apparatus of the present invention.

FIG. 3 shows in schematic form how the mechanical storage apparatus of the present invention is used in the repertory dialing system of the copending application of Blake, de Hilster and Porter referred to above. Fourteen pulses generated by pulse generating circuitry 330 are routed through a matrix formed by the two orthogonal sets of parallel conductors of a digit storage module 300. The pulses from pulse generating circuitry 330 are routed to signal generating circuitry 340 with the 14 pulses appearing in a predetermined sequence over conductors designated 1–0, for the digits, P, for priority and C/A for conference, to correspond to a predetermined directory number.

Assuming that the digit storage module 300 associated with a pushbutton of a repertory dialing instrument, is coded to provide a directory number P–419–486–8549, the first pulse of the 14 pulses received from the pulse generating circuit 330 will appear at the first conductor 301 of one of the rows of the matrix. The pulse is extended via spring connector 302 to a lead designated "P" for a priority command. From lead "P," the pulse will be passed to the signal generating circuitry 340.

A second pulse received at conductor 303 is extended via spring connector 305 to a conductor designated "4" for digit 4 to signal generating circuitry 340.

Similarly pulses appearing at conductors of rows 3–11 of the matrix would also be routed through the matrix via spring connectors to appropriate ones of the conductors according to the preestablished coding of the storage module 300 so that consecutive pulses will appear on leads P–419–486–8549 and be routed to the signal generating circuitry 340.

Since in this case, the directory number has only 11 digits, the three springs associated with rows 12–14 are simply positioned upon a conductor marked OFF which does not have to be connected to the succeeding circuitry.

Referring to FIG. 2A, the board 209 is programmed so that a pulse on the input lead designated 1, will be routed to an output lead designated P for priority. A contact spring 202 (which is the same spring as 302 in FIG. 3) is placed between holes 210, 211 and 212 so that when the program board is assembled, the spring 202, shown in FIG. 2A, would have contact portion 202*a* in contact with a conductor connected to lead 1 of FIG. 3, and a contact portion 202*b* in contact with conductor marked P of FIG. 3. Thus the pulse on input lead 1 will be routed to conductor P via contact spring 202 and then to the signal generating circuitry (FIG. 3). It should be noted that the indications near the left and lower edges of 209 are the designations actually on 209 and that the indication P, for example, is placed a little higher than the P conductor on the lower board. This is for the convenience of a service man who can position the portion 202*a* at the intersection of the P and 1 indicators.

Similarly, a second contact spring 205 placed between holes 213, 214, and 215 connects a second input conductor designated 2 to a second output conductor designated as 4, the second digit of the stored directory number. The other 12 pulses incoming over input conductors 3–14 in the illustrated number P–419–468–8549 are routed to one of the digit conductors to be coded to represent a particular digit value. In the illustrative example, the last three pulses on leads 12–14 are not used since an 11 digit number is stored on the card, and pulses on these conductors are routed to a lead marked OFF. For example, the 14th pulse is routed from a conductor 14 to the lead OFF via the contact spring 208 placed in holes such as 216, 217, and 218.

The 13 leads designated C/A, P, 0–1, and OFF, outcoming from the storage module card 209 are extended to the signal generating circuit as shown in FIG. 3. Every time a particular digit exists in the stored directory number a pulse on a conductor incoming to the storage module, is routed over that digit conductor to one of the 13 leads corresponding to the digital value of that particular digit. The signal generating circuit 340 is responsive to these pulses to generate signals for each digit of the directory number stored in the module.

Figure 4:
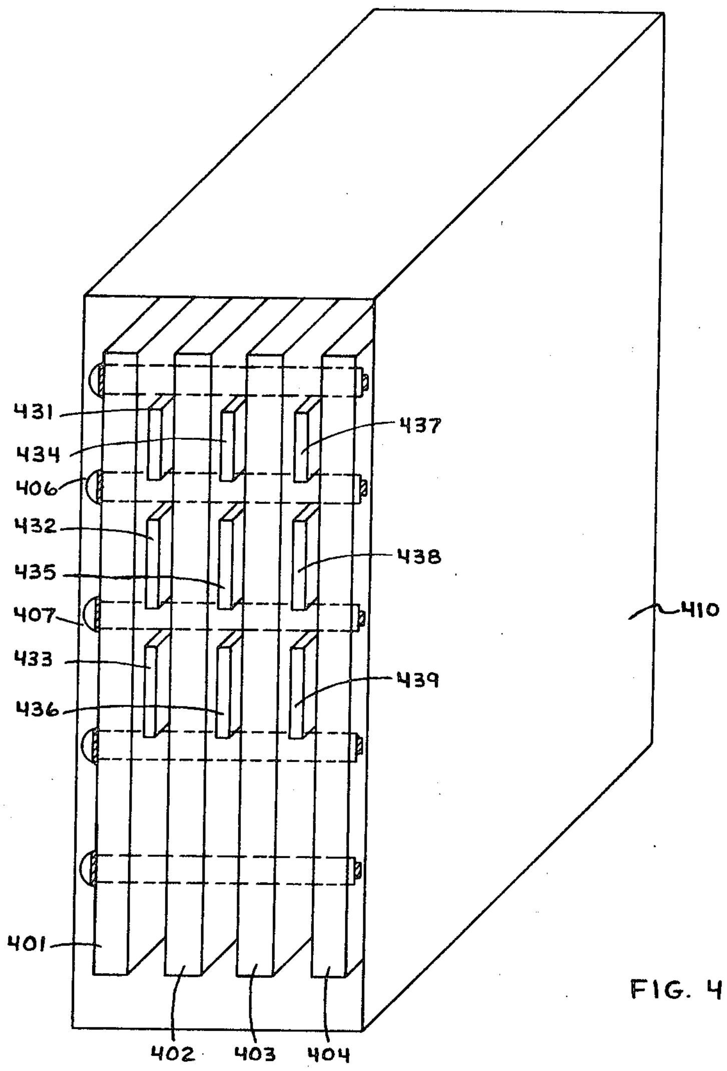
FIG. 4 shows a packaging arrangement for a plurality of storage modules.

A plurality of storage modules are generally required in a typical application and a pair of conductor bearing boards may be used to provide orthogonal sets of conductors for a number of program boards each of which is similar to program board 209 shown in FIG. 2A. Each program board is separated from the other by insulating spacers in between them. Thus, as shown in FIG. 4, an isometric view of an assembly in which nine program boards 431–439 separated into groups of three boards are placed between an adjacent pair of conductor bearing boards. Thus, program cards 431–433 are sandwiched between boards 401 and 402; program boards 434–436 are sandwiched between boards 402 and 403, and program boards 437–439 are sandwiched between boards 403 and 404. The program boards of each group, such as program boards 431–433 are separated from one another by spacers 406, 407.

In this assembly, the inner conductor bearing boards 402 and 403 could carry conductors on both sides. More specifically, boards 401, 402, and 403 each could carry on the right side thereof a set of vertical conductors C/A, P, 0–1, and OFF. Boards 402, 403 and 404 each could carry, on the left side thereof, three horizontal sets of conductors 1–14.

The entire assembly may be arranged with printed circuit board edge jack connectors (not shown) for the printed circuit conductors, and when the assembly is inserted into cooperating jacks (not shown) the individual connections to the circuitry of FIGS. 330 and 340 are established. In other words the assembly may comprises a plug-in module for plugging into a larger circuit assembly. Alternatively, the entire assembly may be arranged in its own housing, such as 410.

I claim:

1. In a telephone repertory dialing system, program means comprising a stack of sheets of insulating material including a first sheet having a first group of conductors disposed on a surface thereof, a second sheet of insulating material stacked over said first sheet and having a second group of conductors disposed on a surface thereof opposite to the conductor bearing surface of said first sheet, a third sheet of insulating material interposed between said first and second sheets, spacing said first sheet from said second sheet and insulating the conductors on said first sheet from the conductors on said second sheet, and connecting means disposed on said third sheet for selectively interconnecting the conductors of said first and second groups to establish predetermined paths over said program means, said connecting means including an S-shaped contact spring for establishing one of said paths, said contact spring having first and second contact portions, said first contact portion extending from said third sheet adjacent said first sheet and contacting a first conductor on said first sheet, said second contact portion extending from said third sheet adjacent said second sheet and contacting a second conductor on said second sheet whereby said first and second conductors are interconnected by said contact spring.

2. Apparatus as set forth in claim 1 in which said third sheet has a plurality of apertures located adjacent said first and second conductors on said first and second sheets, said contact spring threading said apertures to be positioned adjacent said first and second conductors.

3. Apparatus as set forth in claim 2 in which said contact spring includes means integrally formed at one end thereof engaging the surfaces of said third sheet adjacent one of said apertures to maintain said contact spring in said apertures.

* * * * *